United States Patent
Jinno et al.

(10) Patent No.: US 9,022,191 B2
(45) Date of Patent: May 5, 2015

(54) HYDRAULIC PRESSURE CONTROL DEVICE

(75) Inventors: Tomoya Jinno, Nishio (JP); Tetsuya Shimizu, Anjo (JP); Kazunori Ishikawa, Toyota (JP)

(73) Assignee: Aisin AW Co., Ltd., Anjo (JP)

( * ) Notice: Subject to any disclaimer, the term of this patent is extended or adjusted under 35 U.S.C. 154(b) by 571 days.

(21) Appl. No.: 13/434,076

(22) Filed: Mar. 29, 2012

(65) Prior Publication Data

US 2012/0247095 A1 Oct. 4, 2012

(30) Foreign Application Priority Data

Mar. 30, 2011 (JP) ................................. 2011-075837

(51) Int. Cl.
*F16H 61/14* (2006.01)

(52) U.S. Cl.
CPC .................................... *F16H 61/143* (2013.01)

(58) Field of Classification Search
CPC .............................................. F16H 2045/0215
See application file for complete search history.

(56) References Cited

U.S. PATENT DOCUMENTS

| | | | | |
|---|---|---|---|---|
| 5,010,991 | A * | 4/1991 | Tsukamoto et al. | 192/3.3 |
| 7,341,133 | B2 * | 3/2008 | Ando et al. | 192/3.3 |
| 7,582,042 | B2 * | 9/2009 | Sato et al. | 477/158 |
| 7,617,676 | B2 * | 11/2009 | Fukushima et al. | 60/329 |
| 2006/0196746 | A1 | 9/2006 | Nozaki et al. | |
| 2010/0282558 | A1 | 11/2010 | Ishiwada et al. | |
| 2011/0132717 | A1 * | 6/2011 | Sugiura et al. | 192/85.63 |

FOREIGN PATENT DOCUMENTS

| | | |
|---|---|---|
| JP | A-63-176863 | 7/1988 |
| JP | A-2003-042287 | 2/2003 |
| JP | A-2007-263208 | 10/2007 |
| JP | A-2009-121623 | 6/2009 |

OTHER PUBLICATIONS

May 29, 2012 International Search Report issued in International Patent Application No. PCT/JP2012/057224 (with translation).

* cited by examiner

*Primary Examiner* — Richard Lorence
(74) *Attorney, Agent, or Firm* — Oliff PLC

(57) ABSTRACT

A hydraulic pressure control device including a pump driven to generate hydraulic pressure; a first pressure regulation valve that regulates hydraulic pressure in a first passage coupled to a pump along with discharge of oil; a second pressure regulation valve that receives the hydraulic pressure in the first passage and regulates the hydraulic pressure to an engagement pressure to engage a lock-up clutch according to a first signal pressure to output the engagement pressure to a second passage that supplies the oil to an engagement chamber; and a third pressure regulation valve that receives the hydraulic pressure in the first passage or the engagement pressure output to the second passage and regulates the received pressure according to the first signal pressure or a second signal pressure that synchronizes with the first signal pressure to output the resulting pressure to a third passage that supplies the oil to the disengagement chamber.

5 Claims, 4 Drawing Sheets

HYDRAULIC PRESSURE CONTROL DEVICE

INCORPORATION BY REFERENCE

The disclosure of Japanese Patent Application No. 2011-075837 filed on Mar. 30, 2011 including the specification, drawings and abstract is incorporated herein by reference in its entirety.

BACKGROUND OF THE INVENTION

The present invention relates to a hydraulic pressure control device, and more particularly to a hydraulic pressure control device that controls supply of a hydraulic pressure to a torque converter including a lock-up clutch that is engaged in accordance with a difference in oil pressure between an engagement oil chamber and a disengagement oil chamber.

DESCRIPTION OF THE RELATED ART

Hitherto, there has been proposed a hydraulic pressure control device including a primary regulator valve that regulates a hydraulic pressure from a hydraulic pump driven by power of an engine to a line pressure while discharging an excessive pressure, a secondary regulator valve that regulates the excessive pressure discharged from the primary regulator valve to a secondary pressure, a lock-up control valve that drops the secondary pressure regulated by the secondary regulator valve, and a lock-up relay valve connected to the secondary regulator valve, the lock-up control valve, and an engagement oil chamber and a disengagement oil chamber of a lock-up clutch of a torque converter via an oil passage to switch connection of the oil passages in accordance with engagement and disengagement of the lock-up clutch, which is engaged in accordance with a difference in pressure between the engagement oil chamber and the disengagement oil chamber, in order to control a hydraulic pressure to be supplied to the torque converter (see Japanese Patent Application Publication No. 2003-42287, for example). In the device, when the lock-up clutch is to be disengaged, the lock-up relay valve is switched to form an oil passage that allows the secondary pressure to be input to the disengagement oil chamber and that allows the secondary pressure input to the disengagement oil chamber to be output from the engagement oil chamber. When the lock-up clutch is to be engaged, meanwhile, the lock-up control valve is controlled so as to drop the secondary pressure, and the lock-up relay valve is switched to form an oil passage that allows the dropped hydraulic pressure to be input to the disengagement oil chamber and that allows the secondary pressure to be input to the engagement oil chamber.

SUMMARY OF THE INVENTION

In the device discussed above in which the secondary pressure obtained by regulating the excessive pressure discharged from the primary regulator valve is used as the source pressure for controlling the lock-up clutch, it may be difficult to smoothly engage the lock-up clutch in the case where little excessive pressure is discharged from the primary regulator valve because the rotational speed of the engine is low and the ejection pressure of the hydraulic pump is low.

A main object of the hydraulic pressure control device according to the present invention is to smoothly engage a lock-up clutch even from a state in which the ejection pressure of a pump is low.

In order to achieve the foregoing main object, the hydraulic pressure control device according to the present invention adopts the following means.

A hydraulic pressure control device according to a first aspect of the present invention controls supply of a hydraulic pressure to a torque converter including a lock-up clutch that is engaged in accordance with a difference in pressure of oil between an engagement oil chamber and a disengagement oil chamber. The hydraulic pressure control device according to the first aspect includes: a mechanical pump driven by power from a motor to generate a hydraulic pressure; a first pressure regulation valve that regulates a hydraulic pressure in a first oil passage coupled to the mechanical pump along with discharge of oil; a second pressure regulation valve that receives the hydraulic pressure in the first oil passage and regulates the received pressure to an engagement pressure for use for engagement of the lock-up clutch in accordance with a first signal pressure to output the engagement pressure to a second oil passage that supplies the oil to the engagement oil chamber; and a third pressure regulation valve that receives the hydraulic pressure in the first oil passage or the engagement pressure output to the second oil passage and regulates the received hydraulic pressure in accordance with the first signal pressure or a second signal pressure that synchronizes with the first signal pressure to output the resulting pressure to a third oil passage that supplies the oil to the disengagement oil chamber.

The hydraulic pressure control device according to the first aspect of the present invention includes the second pressure regulation valve that receives the hydraulic pressure in the first oil passage, which is connected to the mechanical pump driven by power from the motor to generate the hydraulic pressure, and regulates the received hydraulic pressure to the engagement pressure for use for engagement of the lock-up clutch in accordance with the first signal pressure to output the engagement pressure to the second oil passage that supplies the oil to the engagement oil chamber, and the third pressure regulation valve that receives the hydraulic pressure in the first oil passage or the engagement pressure output to the second oil passage and regulates the received pressure in accordance with the first signal pressure or the second signal pressure that synchronizes with the first signal pressure to output the resulting pressure to the third oil passage that supplies the oil to the disengagement oil chamber. This allows the lock-up clutch to be smoothly engaged even in the case where power output from the motor is relatively small and the ejection pressure of the mechanical pump is low. Synchronizing the first signal pressure input to the second pressure regulation valve and the second signal pressure input to the third pressure regulation valve with each other can prevent control for the pressure regulation valves from being complicated. Alternatively, inputting the same signal pressure to the second pressure regulation valve and the third pressure regulation valve can make the entire device compact by allowing common use of components for generating the signal pressure, in addition to preventing control for the pressure regulation valves from being complicated. Here, in a hydraulic pressure control device mounted on an automatic transmission that transfers power of a motor input via a torque converter with the speed ratio changed by switching the engagement states of friction engagement elements, for example, the hydraulic pressure in the first oil passage may be a hydraulic pressure for use as the engagement pressures for the friction engagement elements.

In the hydraulic pressure control device according to the first aspect of the present invention, the second pressure regulation valve may be configured to output a pressure that becomes higher as the first signal pressure becomes higher, and the third pressure regulation valve may be configured to output a pressure that becomes lower as the first signal pressure or the second signal pressure becomes higher. In the hydraulic pressure control device according to this aspect of the present invention, the second pressure regulation valve and the third pressure regulation valve may be configured such that the difference in pressure of the oil between the engagement oil chamber and the disengagement oil chamber becomes larger as the first signal pressure becomes higher. This makes it possible to engage the lock-up clutch while suppressing an engagement shock. In the hydraulic pressure control device according to this aspect of the present invention, the second pressure regulation valve may increasingly boost the pressure as the first signal pressure becomes higher until the first signal pressure reaches a predetermined pressure, and may keep a maximum pressure irrespective of the first signal pressure after the first signal pressure reaches the predetermined pressure, and the third pressure regulation valve may increasingly drop the pressure as the first signal pressure becomes higher.

A hydraulic pressure control device according to a second aspect of the present invention controls supply of a hydraulic pressure to a torque converter including a lock-up clutch that is engaged in accordance with a difference in pressure of oil between an engagement oil chamber and a disengagement oil chamber. The hydraulic pressure control device according to the second aspect includes: a mechanical pump driven by power from a motor to generate a hydraulic pressure; a first pressure regulation valve that regulates a hydraulic pressure in a first oil passage coupled to the mechanical pump along with discharge of oil; a second pressure regulation valve that receives the hydraulic pressure in the first oil passage and regulates the received hydraulic pressure to an engagement pressure for use for engagement of the lock-up clutch to output the engagement pressure to a second oil passage that supplies the oil to the engagement oil chamber; a third pressure regulation valve that receives and regulates the hydraulic pressure in the first oil passage or the engagement pressure output to the second oil passage to output the resulting pressure to a third oil passage that supplies the oil to the disengagement oil chamber; and a control unit for controlling the second pressure regulation valve and the third pressure regulation valve in synchronization with each other such that the difference in pressure of the oil between the engagement oil chamber and the disengagement oil chamber becomes a target pressure difference.

The hydraulic pressure control device according to the second aspect of the present invention includes the second pressure regulation valve which receives the hydraulic pressure in the first oil passage, which is connected to the mechanical pump driven by power from the motor to generate the hydraulic pressure, and regulates the received hydraulic pressure to the engagement pressure for use for engagement of the lock-up clutch to output the engagement pressure to the second oil passage that supplies the oil to the engagement oil chamber, the third pressure regulation valve that receives the hydraulic pressure in the first oil passage or the engagement pressure output to the second oil passage and regulates the received pressure to output the resulting pressure to the third oil passage that supplies the oil to the disengagement oil chamber, and the control unit for controlling the second pressure regulation valve and the third pressure regulation valve in synchronization with each other such that the difference in pressure of the oil between the engagement oil chamber and the disengagement oil chamber becomes the target pressure difference. This allows the lock-up clutch to be smoothly engaged even in the case where power output from the motor is relatively small and the ejection pressure of the mechanical pump is low. In addition, controlling the second pressure regulation valve and the third pressure regulation valve in synchronization with each other can prevent control for the pressure regulation valves from being complicated.

In the hydraulic pressure control device according to the first aspect or second aspect of the present invention, the third pressure regulation valve may be disposed in series with and in a stage subsequent to the second pressure regulation valve.

The hydraulic pressure control device according to the first aspect or second aspect of the present invention may further include a switching valve connected to the second oil passage, the third oil passage, a discharge oil passage through which the oil is discharged from the first pressure regulation valve, an engagement oil passage coupled to the engagement oil chamber, and a disengagement oil passage coupled to the disengagement oil chamber, the switching valve being selectively switchable between a first state in which the second oil passage and the engagement oil passage are connected to each other and the third oil passage and the disengagement oil passage are connected to each other and a second state in which the discharge oil passage and the disengagement oil passage are connected to each other, and the switching valve being switched to the first state to engage the lock-up clutch and switched to the second state to disengage the lock-up clutch. This allows the oil discharged along with pressure regulation performed by the first pressure regulation valve to be used when the lock-up clutch is being disengaged. This eliminates the need to increase the amount of ejection of the mechanical pump more than necessary, and makes it possible to prevent an increase in size of the mechanical pump.

DETAILED DESCRIPTION OF THE EMBODIMENTS

Now, an embodiment of the present invention will be described below.

Figure 1:
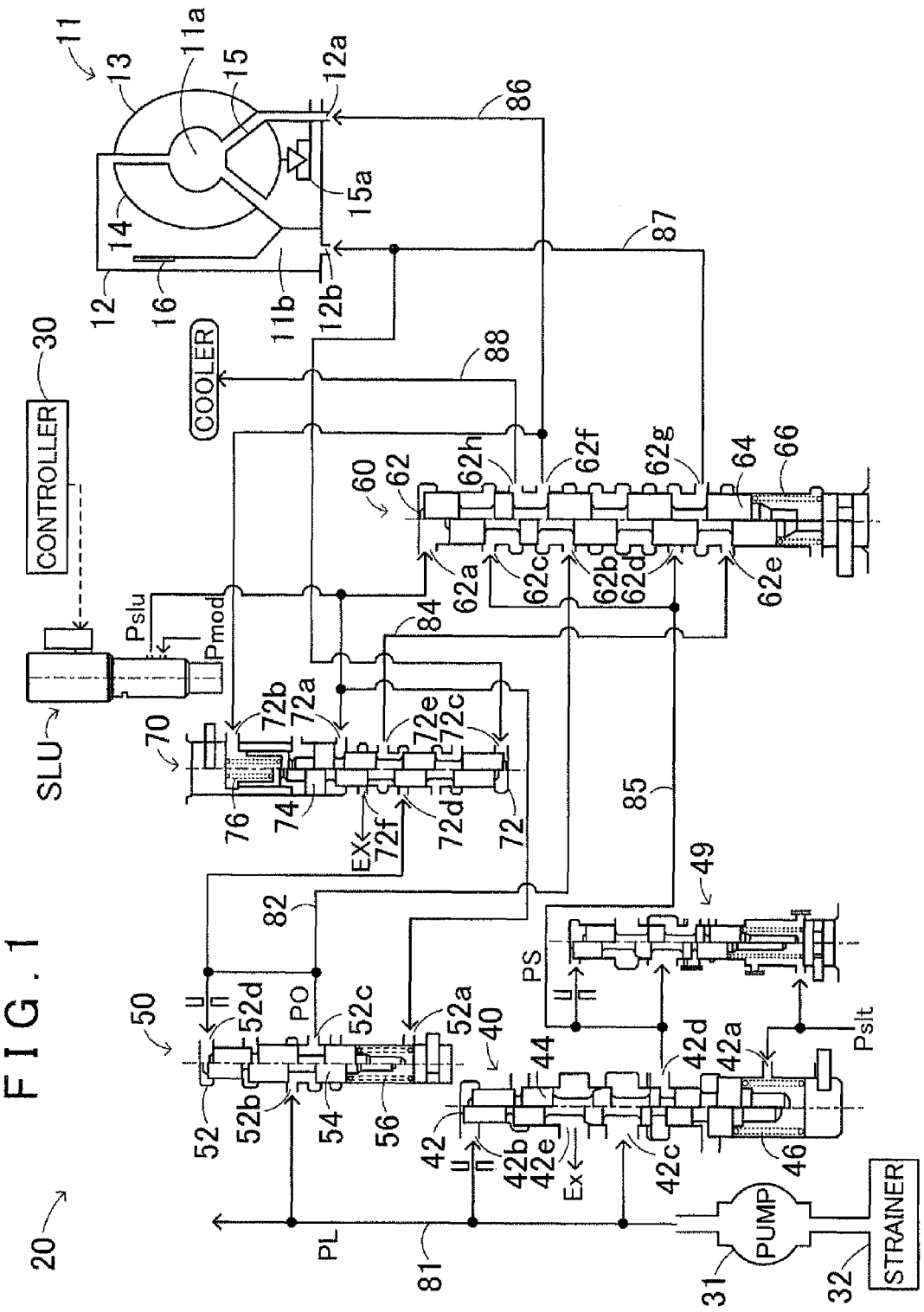
FIG. 1 is a diagram showing a schematic configuration of a hydraulic pressure control device 20.

FIG. 1 is a diagram showing a schematic configuration of a hydraulic pressure control device 20 according to an embodiment of the present invention. The hydraulic pressure control device 20 according to the embodiment is formed as a device that is provided in an automobile incorporating an engine and an automatic transmission (all not shown) and that controls a hydraulic pressure to be supplied to a torque converter 11 that receives engine torque output to a crankshaft of the engine and transfers the input torque to an input shaft of the automatic transmission.

The torque converter 11 includes a pump impeller 13 connected to the crankshaft via a converter cover 12, a turbine runner 14 connected to the input shaft and disposed opposite the pump impeller 13, a stator 15 which is disposed between the pump impeller 13 and the turbine runner 14 and to which a one-way clutch 15*a* that allows rotation only in one direction is attached, and a lock-up clutch 16 that directly couples the pump impeller 13 (converter cover 12) and the turbine runner 14 to each other. Transfer of torque through the torque converter 11 is performed by the pump impeller 13 converting the engine torque into a flow of oil and by the turbine runner 14 converting the flow of the oil into torque on the input shaft of the automatic transmission. An oil chamber in the torque converter 11 is partitioned by the lock-up clutch 16 into an engagement oil chamber 11a and a disengagement oil chamber 11b. An engagement oil chamber port 12a through which the oil is input to and output from the engagement oil chamber 11a and a disengagement oil chamber port 12b through which the oil is input to and output from the disengagement oil chamber 11b are formed. In the torque converter 11, the lock-up clutch 16 is engaged by an engagement pressure corresponding to a pressure difference between the hydraulic pressure in the engagement oil chamber 11a and the hydraulic pressure in the disengagement oil chamber 11b. Engagement includes a state in which the lock-up clutch 16 is completely engaged and a state in which the lock-up clutch 16 is half engaged (under so-called slip control). When the lock-up clutch 16 is completely engaged, the pump impeller 13 on the input side and the turbine runner 14 on the output side are directly coupled to each other so that the engine torque is mechanically and directly transferred to the input shaft of the automatic transmission.

As shown in FIG. 1, the hydraulic pressure control device 20 includes a mechanical oil pump 31 driven by power from the engine to pump the oil from an oil pan (not shown) to a line pressure oil passage 81 via a strainer 32, a primary regulator valve 40 that is driven by a signal pressure Pslt from a linear solenoid SLT (not shown) and that regulates the pressure of the oil pumped to the line pressure oil passage 81 and generates a line pressure PL to output the oil to a secondary pressure oil passage 85 in accordance with the generated line pressure PL, a secondary regulator valve 49 that is driven by the signal pressure Pslt from the linear solenoid SLT (not shown) and that regulates the pressure of the oil in the secondary pressure oil passage 85 to generate a secondary pressure PS, a pressure regulation valve 50 that receives the line pressure PL in the line pressure oil passage 81 and regulates the line pressure PL to an engagement pressure P0 for use for engagement of the lock-up clutch 16 to output the engagement pressure P0 to an engagement pressure oil passage 82, a lock-up relay valve 60 that switches between paths through which the oil is supplied to the torque converter 11, a lock-up control valve 70 that is disposed in series with and in a stage subsequent to the pressure regulation valve 50 and that receives the engagement pressure P0 output to the engagement pressure oil passage 82 and regulates the engagement pressure P0 to output the resulting pressure to a communication oil passage 84 connected to the lock-up relay valve 60, a linear solenoid SLU that receives a modulator pressure Pmod from a modulator valve (not shown) and that regulates the modulator pressure Pmod to output a signal pressure for driving the pressure regulation valve 50, the lock-up relay valve 60, and the lock-up control valve 70, and a controller 30 that controls drive of the linear solenoid SLU. Although not shown, the controller 30 is formed as a microprocessor including a CPU as its main component, and includes a ROM that stores a processing program, a RAM that temporarily stores data, and so forth in addition to the CPU. The line pressure PL is also used to control the engagement pressures for friction engagement elements such as clutches and brakes provided in the automatic transmission, for example.

The primary regulator valve 40 includes a sleeve 42 formed with various ports, a spool 44 that slides in the sleeve 42 in the axial direction, and a spring 46 that urges the spool 44 in the axial direction. The various ports formed in the sleeve 42 include: a signal pressure input port 42a that receives as a signal pressure an output pressure Pslt from the linear solenoid SLT (not shown); a feedback pressure input port 42b connected to the line pressure oil passage 81 to receive the line pressure PL as a feedback pressure; an input port 42c connected to the line pressure oil passage 81 to receive the line pressure PL; an output port 42d connected to the secondary pressure oil passage 85 to output the oil along with generation of the line pressure PL; and a drain port 42e. The spool 44 is urged upward in the drawing by the spring force of the spring 46 and the signal pressure input to the signal pressure input port 42a, and urged downward in the drawing by the feedback pressure input to the feedback pressure input port 42b. As the spool 44 is increasingly moved downward in the drawing, the amount of oil from the input port 42c output to the secondary pressure oil passage 85 via the output port 42d is increased, and the oil from the input port 42c is drained via the drain port 42e. In the primary regulator valve 40, in the case where the ejection pressure of the mechanical oil pump 31 is low and therefore the line pressure PL is low, the feedback pressure input to the feedback pressure input port 42b is also low, which reduces the force that urges the spool 44 downward in the drawing. Thus, little oil is discharged to the secondary pressure oil passage 85. As the line pressure PL becomes higher to exceed a predetermined upper limit pressure, meanwhile, the feedback pressure input to the feedback pressure input port 42b accordingly becomes higher, which increases the force that urges the spool 44 downward in the drawing. Thus, the oil at an excessive pressure exceeding the upper limit pressure is output to the secondary pressure oil passage 85 as a discharge pressure, or drained from the drain port 42e, so that the line pressure PL is kept generally constant at the upper limit pressure.

The pressure regulation valve 50 is a pressure regulation valve driven by an output pressure Pslu from the linear solenoid SLU, and includes a sleeve 52 formed with various ports, a spool 54 that slides in the sleeve 52 in the axial direction, and a spring 56 that urges the spool 54 in the axial direction. The various ports formed in the sleeve 52 include: a signal pressure input port 52a that receives as a signal pressure the output pressure Pslu from the linear solenoid SLU; an input port 52b connected to the line pressure oil passage 81 to receive the line pressure PL; an output port 52c connected to the engagement pressure oil passage 82 to output the engagement pressure P0 obtained by regulating the line pressure PL input from the input port 52b; and a feedback pressure input port 52d that receives the engagement pressure P0 in the engagement pressure oil passage 82 as a feedback pressure. The spool 54 is urged upward in the drawing by the spring force of the spring 56 and the signal pressure input to the signal pressure input port 52a, and urged downward in the drawing by the feedback pressure input to the feedback pressure input port 52b. In the pressure regulation valve 50, the area of communication between the input port 52b and the output port 52c is adjusted in accordance with movement of the spool 54. As the signal pressure input to the signal pressure input port 52a becomes higher, the spool 54 is gradually moved from the state indicated in the right half in the drawing to the state indicated in the left half in the drawing to gradually increase the opening of the input port 52b. Therefore, the engagement pressure P0 output from the output port 52c becomes gradually higher as the signal pressure input to the signal pressure input port 52a becomes higher. In the embodiment, in addition, when the output pressure Pslu from the linear solenoid SLU reaches a predetermined pressure Pslu1 that is lower than the maximum pressure, the pressure regulation valve 50 is brought into the state indicated in the left half in the drawing, which causes the input port 52b to communicate with the output port 52c with the maximum opening and to output the engagement pressure P0.

The lock-up relay valve 60 is a switching valve (on/off valve) driven by the output pressure Pslu from the linear solenoid SLU, and includes a sleeve 62 formed with various ports, a spool 64 that slides in the sleeve 62 in the axial direction, and a spring 66 that urges the spool 64 in the axial direction. The various ports formed in the sleeve 62 include: a signal pressure input port 62a that receives as a signal pressure the output pressure Pslu from the linear solenoid SLU; an input port 62b connected to the engagement pressure oil passage 82 to receive the engagement pressure P0; input ports 62c and 62d connected to the secondary pressure oil passage 85 to receive the secondary pressure PS; an input port 62e connected to the communication oil passage 84 to receive a hydraulic pressure obtained by the lock-up control valve 70 dropping the engagement pressure P0; an output port 62f connected to an engagement oil chamber oil passage 86 coupled to the engagement oil chamber port 12a of the engagement oil chamber 11a; an output port 62g connected to a disengagement oil chamber oil passage 87 coupled to the disengagement oil chamber port 12b of the disengagement oil chamber 11b; and an output port 62h connected to a cooler oil passage 88 coupled to a cooler (COOLER). The spool 64 is urged upward in the drawing by the spring force of the spring 66, and urged downward in the drawing by the signal pressure input to the signal pressure input port 62a.

In the lock-up relay valve 60, when no signal pressure is input from the linear solenoid SLU to the signal pressure input port 62a, the spool 64 is moved by the urging force of the spring 66 into the state indicated in the right half in FIG. 1. Therefore, communication between the input port 62d and the output port 62g is allowed, and communication between the output port 62f and the output port 62h is allowed. This allows communication between the secondary pressure oil passage 85 and the disengagement oil chamber oil passage 87 and communication between the engagement oil chamber oil passage 86 and the cooler oil passage 88. When the signal pressure is input from the linear solenoid SLU to the signal pressure input port 62a, meanwhile, the spool 64 is moved against the urging force of the spring 66 into the state indicated in the left half in the drawing. Therefore, communication between the input port 62b and the output port 62f is allowed, communication between the input port 62c and the output port 62h is allowed, and communication between the input port 62e and the output port 62g is allowed. This allows communication between the engagement pressure oil passage 82 and the engagement oil chamber oil passage 86, communication between the communication oil passage 84 and the disengagement oil chamber oil passage 87, and communication between the secondary pressure oil passage 85 and the cooler oil passage 88.

The lock-up control valve 70 is a pressure regulation valve driven by the output pressure Pslu from the linear solenoid SLU in synchronization with the pressure regulation valve 50, and includes a sleeve 72 formed with various ports, a spool 74 disposed so as to freely slidable in the sleeve 72 in the axial direction, and a spring 76 that urges the spool 74 in the axial direction. The various ports formed in the sleeve 72 include: a signal pressure input port 72a that receives as a signal pressure the output pressure Pslu from the linear solenoid SLU; a feedback pressure input port 72b connected to the engagement oil chamber oil passage 86 to receive a hydraulic pressure in the engagement oil chamber oil passage 86 as a feedback pressure; a feedback pressure input port 72c connected to the disengagement oil chamber oil passage 87 to receive a hydraulic pressure in the disengagement oil chamber oil passage 87 as a feedback pressure; an input port 72d connected to the engagement pressure oil passage 82 to receive the engagement pressure P0; an output port 72e connected to the communication oil passage 84 to output a hydraulic pressure obtained by dropping the engagement pressure P0 input from the input port 72d; and a drain port 72f. The signal pressure input port 72a is formed at a position between two lands formed on the spool 74 with different outside diameters. Therefore, the signal pressure input to the signal pressure input port 72a acts as a force that urges the spool 74 upward in the drawing because of the difference in area (difference in outside diameter) between respective pressure reception surfaces of the two lands, namely a land with a larger diameter on the upper side in the drawing and a land with a smaller diameter on the lower side in the drawing.

In the lock-up control valve 70, the spool 74 is urged downward in the drawing by the spring force of the spring 76 and the feedback pressure input to the feedback pressure input port 72b, and urged upward in the drawing by the signal pressure input to the signal pressure input port 72a and the feedback pressure input to the feedback pressure input port 72c. Therefore, the spool 74 is moved to a position at which such forces and pressures are balanced against each other, and the area of communication between the input port 72d and the output port 72e of the lock-up control valve 70 is adjusted through the movement of the spool 74. FIG. 1 shows the spool 74 positioned at both ends of its movement range. When the output pressure Pslu is not output from the linear solenoid SLU, the spool 74 is moved to the lower-end position indicated in the right half in the drawing. When the maximum output pressure Pslu is output from the linear solenoid SLU, the spool 74 is moved to the upper-end position indicated in the left half in the drawing. When the output pressure Pslu is not output from the linear solenoid SLU so that the spool 74 is moved to the lower-end position, communication between the input port 72d and the output port 72e is allowed to allow communication between the engagement pressure oil passage 82 and the communication oil passage 84. Then, when the output pressure Pslu from the linear solenoid SLU becomes gradually higher to increase the signal pressure input to the signal pressure input port 72a, the spool 74 is gradually moved upward in the drawing to gradually reduce the area of opening of the input port 72d along with the movement of the spool 74. Therefore, the hydraulic pressure output from the output port 72e to the communication oil passage 84 becomes lower as the signal pressure input to the signal pressure input port 72a becomes higher. That is, a lower hydraulic pressure obtained by increasingly dropping the engagement pressure P0 is output to the communication oil passage 84 as the output pressure Pslu from the linear solenoid SLU becomes higher and the spool 74 is increasingly moved upward in the drawing. Then, when the maximum output pressure Pslu is output from the linear solenoid SLU, the spool 74 is moved to the upper-end position indicated in the left half in the drawing, which blocks communication between the input port 72d and the output port 72e and allows communication between the output port 72e and the drain port 72f. This allows the oil in the communication oil passage 84 to be drained.

Next, an operation of the thus configured hydraulic pressure control device 20 to supply a hydraulic pressure to the torque converter 11 will be described. First, an operation to establish a disengaged state in which the lock-up clutch 16 is disengaged will be described. This state can be established by turning off the linear solenoid SLU. When the linear solenoid SLU is turned off, the pressure regulation valve 50, the lock-up relay valve 60, and the lock-up control valve 70 are each brought into the state indicated in the right half in FIG. 1. Therefore, communication between the secondary pressure oil passage 85 and the disengagement oil chamber oil passage 87 is allowed, and communication between the engagement oil chamber oil passage 86 and the cooler oil passage 88 is allowed. This allows the secondary pressure PS, which has been output from the primary regulator valve 40 to the secondary pressure oil passage 85 and regulated by the secondary regulator valve 49, to be input to the disengagement oil chamber 11b of the torque converter 11 via the disengagement oil chamber oil passage 87 and then output from the engagement oil chamber 11a to the engagement oil chamber oil passage 86. The oil output to the engagement oil chamber oil passage 86 is supplied to the cooler via the cooler oil passage 88 to be returned to the oil pan (not shown). That is, an oil passage that circulates the oil to disengage the lock-up clutch 16 is formed. Thus, when the lock-up clutch 16 is to be disengaged, the secondary pressure PS in the secondary pressure oil passage 85 is circulated.

Figure 2:
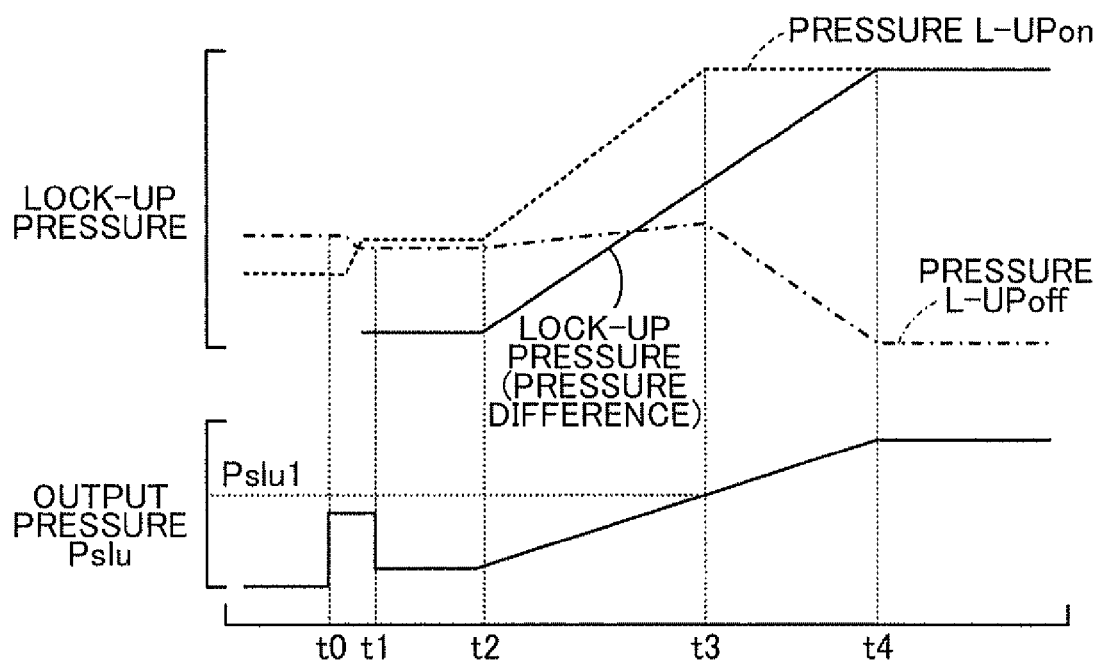
FIG. 2 illustrates temporal changes in lock-up pressure and output pressure Pslu from a linear solenoid SLU.

Subsequently, an operation to bring the lock-up clutch 16 in the disengaged state into an engaged state will be described. Here, as discussed above, the lock-up clutch 16 is engaged by the engagement pressure corresponding to the pressure difference between the hydraulic pressure in the engagement oil chamber 11a and the hydraulic pressure in the disengagement oil chamber 11b, and the controller 30 controls the pressure regulation valve 50 and the lock-up control valve 70 by adjusting the output pressure Pslu from the linear solenoid SLU such that the pressure difference becomes a target pressure difference. FIG. 2 illustrates temporal changes in lock-up pressure and output pressure Pslu from the linear solenoid SLU. In FIG. 2, a pressure L-UPon corresponds to the engagement pressure P0 in the engagement pressure oil passage 82, and indicates the hydraulic pressure in the engagement oil chamber 11a. A pressure L-UPoff corresponds to the hydraulic pressure in the communication oil passage 84, and indicates the hydraulic pressure in the disengagement oil chamber 11b. A lock-up pressure indicates the pressure difference between the hydraulic pressure in the engagement oil chamber 11a and the hydraulic pressure in the disengagement oil chamber 11b. The pressure difference between the hydraulic pressure in the engagement oil chamber 11a and the hydraulic pressure in the disengagement oil chamber 11b matches the target pressure difference. Thus, the target pressure difference is not shown. First, the controller 30 turns from off to on the linear solenoid SLU to perform fast fill (time t0) in order to establish a low-pressure standby state for standby at a low pressure (time t1). The fast fill allows the oil passages leading to the linear solenoid SLU to be filled with oil so that the output pressure Pslu of the linear solenoid SLU is input to the pressure regulation valve 50, the lock-up relay valve 60, and the lock-up control valve 70. Therefore, the lock-up relay valve 60 is brought into the state indicated in the left half in FIG. 1, and the spools 54 and 74 of the pressure regulation valve 50 and the lock-up control valve 70, respectively, are slightly moved from the position in the right half in FIG. 1. Therefore, communication between the line pressure oil passage 81 and the engagement pressure oil passage 82 is allowed, communication between the engagement pressure oil passage 82 and the engagement oil chamber oil passage 86 is allowed, communication between the engagement pressure oil passage 82 and the communication oil passage 84 is allowed, communication between the communication oil passage 84 and the disengagement oil chamber oil passage 87 is allowed, and communication between the secondary pressure oil passage 85 and the cooler oil passage 88 is allowed. This allows the engagement pressure P0 in the engagement pressure oil passage 82 to be input to the engagement oil chamber 11a of the torque converter 11 via the engagement oil chamber oil passage 86, allows the hydraulic pressure in the communication oil passage 84 obtained by dropping the engagement pressure P0 to be input to the disengagement oil chamber 11b of the torque converter 11 via the disengagement oil chamber oil passage 87, and allows the secondary pressure PS to be input to the cooler. It should be noted, however, that during low-pressure standby, the spool 54 of the pressure regulation valve 50 and the spool 74 of the lock-up control valve 70 are slightly moved from the state indicated in the right half in FIG. 1 as discussed above. Therefore, the area of opening of the input port 52b of the pressure regulation valve 50 is so small that the engagement pressure P0 is low, and the area of opening of the input port 72d of the lock-up control valve 70 is so large that the engagement pressure P0 is dropped only slightly, which results in little lock-up pressure (pressure difference) as shown in the drawing.

Next, when time t2 is reached, the linear solenoid SLU is controlled such that the output pressure Pslu becomes higher in accordance with a predetermined pattern. This causes each of the spool 54 of the pressure regulation valve 50 and the spool 74 of the lock-up control valve 70 to move upward in FIG. 1. As discussed above, as the spool 54 of the pressure regulation valve 50 is increasingly moved upward, the engagement pressure P0 output to the engagement oil passage 82 becomes higher. Thus, the pressure L-UPon becomes gradually higher as the time elapses. Meanwhile, as the spool 74 of the lock-up control valve 70 is increasingly moved upward, a lower hydraulic pressure obtained by increasingly dropping the engagement pressure P0 is output to the communication oil passage 84. Since the engagement pressure P0 input to the lock-up control valve 70 itself has become higher, however, the amount of pressure drop caused by the lock-up control valve 70 is canceled by the amount of pressure boost caused by the pressure regulation valve 50. Therefore, the pressure L-UPoff is not actually reduced, but becomes slightly higher in the embodiment. Then, the lock-up pressure becomes gradually higher because of the pressure difference between the pressure L-UPon and the pressure L-UPoff to start slip control.

As discussed above, when the output pressure Pslu of the linear solenoid SLU reaches the predetermined pressure Pslu1, the pressure regulation valve 50 is brought into the state indicated in the left half in FIG. 1. Therefore, the pressure L-UPon as the engagement pressure P0 reaches the maximum pressure at time t3. Therefore, the pressure L-UPon does not increase but remains generally constant at the maximum pressure at and after time t3. That is, the pressure regulation valve 50 regulates the engagement pressure P0 (pressure L-UPon) so as to become higher as the output pressure Pslu becomes higher until the output pressure Pslu reaches the predetermined pressure Pslu1, and so as to be kept at the maximum pressure irrespective of the output pressure Pslu after the output pressure Pslu reaches the predetermined pressure Pslu1. Thus, at and after time t3, the engagement pressure P0 input to the lock-up control valve 70 is kept constant, and thus a hydraulic pressure that directly reflects the amount of pressure drop caused by the lock-up control valve 70 is output to the communication oil passage 84, that is, a lower hydraulic pressure obtained by increasingly dropping the engagement pressure P0 is output to the communication oil passage 84 as the output pressure Pslu of the linear solenoid SLU becomes higher. This causes the pressure L-UPoff to become gradually lower with respect to the pressure L-UPon, which is kept at the maximum pressure, and thus causes the lock-up pressure, which is a pressure difference therebetween, to become gradually higher. Then, when the output pressure Pslu of the linear solenoid SLU becomes maximum at time t4, the lock-up control valve 70 is brought into the state indicated in the left half in FIG. 1, which allows the oil in the communication oil passage 84 to be drained, and thus also allows the oil in the disengagement oil chamber 11b connected to the communication oil passage 84 via the disengagement oil chamber oil passage 87 to be drained. Therefore, the pressure L-UPoff becomes minimum (a value of 0) and the lock-up pressure becomes maximum so that the lock-up clutch 16 is completely engaged. Thus, in the embodiment, using the line pressure PL in the line pressure oil passage 81 as the source pressure, the pressure regulation valve 50 inputs the engagement pressure P0 to the engagement oil chamber 11a while regulating the engagement pressure P0 so as to become gradually higher, and the lock-up control valve 70 inputs to the disengagement oil chamber 11b a hydraulic pressure obtained by dropping the engagement pressure P0 so as to become gradually lower. This allows the pressure difference between the pressure L-UPon in the engagement oil chamber 11a and the pressure L-UPoff in the disengagement oil chamber 11b to become higher in accordance with the target pressure difference, which makes it possible to engage the lock-up clutch 16 while suppressing an engagement shock.

Here, engagement of the lock-up clutch 16 in the case where the rotational speed of the engine is low (at 900 rpm, 1000 rpm, or so, for example), for example immediately after start of the automobile incorporating the hydraulic pressure control device 20, is considered. In this case, the ejection pressure of the mechanical oil pump 31 is low, and therefore the line pressure PL is also low. The discharge pressure is not output from the primary regulator valve 40 before the line pressure PL reaches the upper limit pressure. In the embodiment, even in such a case, the pressure regulation valve 50 generates the engagement pressure P0 using the line pressure PL in the line pressure oil passage 81 as the source pressure. Thus, the engagement pressure P0 can be generated even from a state in which the line pressure PL is low. Therefore, the engagement pressure PL can be generated in an early stage compared to a case where the secondary pressure PS generated using the discharge pressure output from the primary regulator valve 40 to the secondary pressure oil passage 85 is used as the engagement pressure. In addition, the engagement pressure P0 is input to the engagement oil chamber 11a, and a low hydraulic pressure obtained by the lock-up control valve 70 dropping the engagement pressure P0 is input to the disengagement oil chamber 11b. Thus, the lock-up clutch 16 can be engaged by the pressure difference therebetween in a relatively early stage. Based on these factors, the lock-up clutch 16 can be smoothly engaged even in the case where the ejection pressure of the mechanical oil pump 31 is low, for example immediately after start of the automobile. Moreover, the controller 30 controls the pressure regulation valve 50 and the lock-up control valve 70 so as to be driven in synchronization with each other using the same output pressure Pslu from the linear solenoid SLU as the signal pressure. Thus, it is possible to prevent control from being complicated and to make the entire device compact compared to a case where the pressure regulation valve 50 and the lock-up control valve 70 are controlled individually. Further, when the lock-up clutch 16 is to be disengaged, the lock-up relay valve 60 switches connection of the oil passages to circulate the secondary pressure PS rather than the engagement pressure P0. This eliminates the need to increase the amount of ejection of the mechanical oil pump 31 more than necessary, and makes it possible to prevent an increase in size of the mechanical oil pump 31.

The hydraulic pressure control device according to the embodiment described above includes the pressure regulation valve 50 which regulates the line pressure PL input from the line pressure oil passage 81 to the engagement pressure P0 for use for engagement of the lock-up clutch 16 to output the engagement pressure P0 to the engagement pressure oil passage 82 which supplies the oil to the engagement oil chamber 11a, and the lock-up control valve 70 which drops the engagement pressure P0 input from the engagement pressure oil passage 82 to output the resulting pressure to the communication oil passage 84 which supplies the oil to the disengagement oil chamber 11b. Thus, the lock-up clutch 16 can be smoothly engaged even in the case where power output from the engine is relatively small and the ejection pressure of the mechanical oil pump 31 is low. In addition, the pressure regulation valve 50 and the lock-up control valve 70 are controlled using as the signal pressure the output pressure Pslu from the single linear solenoid SLU. Thus, it is possible to prevent control from being complicated and to make the entire device compact. Further, the pressure difference between the engagement oil chamber 11a and the disengagement oil chamber 11b is gradually increased, and thus the lock-up clutch 16 can be engaged with a suppressed engagement shock. Then, when the lock-up clutch 16 is to be disengaged, the lock-up relay valve 60 switches connection of the oil passages to circulate the secondary pressure PS. This makes it possible to prevent an increase in size of the mechanical oil pump 31.

In the embodiment, the pressure regulation valve 50 and the lock-up control valve 70 are controlled using as the signal pressure the output pressure Pslu from the single linear solenoid SLU. However, the present invention is not limited thereto, and the pressure regulation valve 50 and the lock-up control valve 70 may be controlled using as the signal pressure the output pressure Pslu from separate linear solenoids SLU.

In the embodiment, the engagement pressure P0 output from the pressure regulation valve 50 becomes gradually higher, and a hydraulic pressure obtained by the lock-up control valve 70 dropping the engagement pressure P0 becomes gradually lower. However, the present invention is not limited thereto, and the engagement pressure P0 output from the pressure regulation valve 50 may become higher stepwise, and a hydraulic pressure obtained by the lock-up control valve 70 dropping the engagement pressure P0 may become lower stepwise.

In the embodiment, when the lock-up clutch 16 is to be disengaged, the lock-up relay valve 60 switches connection of the oil passages to circulate the secondary pressure PS. However, the present invention is not limited thereto, and the engagement pressure P0 output from the pressure regulation valve 50 may be circulated.

In the embodiment, the engagement pressure P0 output from the pressure regulation valve 50 becomes maximum when the output pressure Pslu of the linear solenoid SLU reaches the predetermined pressure Pslu1, and is kept thereafter. However, the present invention is not limited thereto, and the engagement pressure P0 may become gradually higher until the output pressure Pslu of the linear solenoid SLU becomes maximum.

Figure 3:
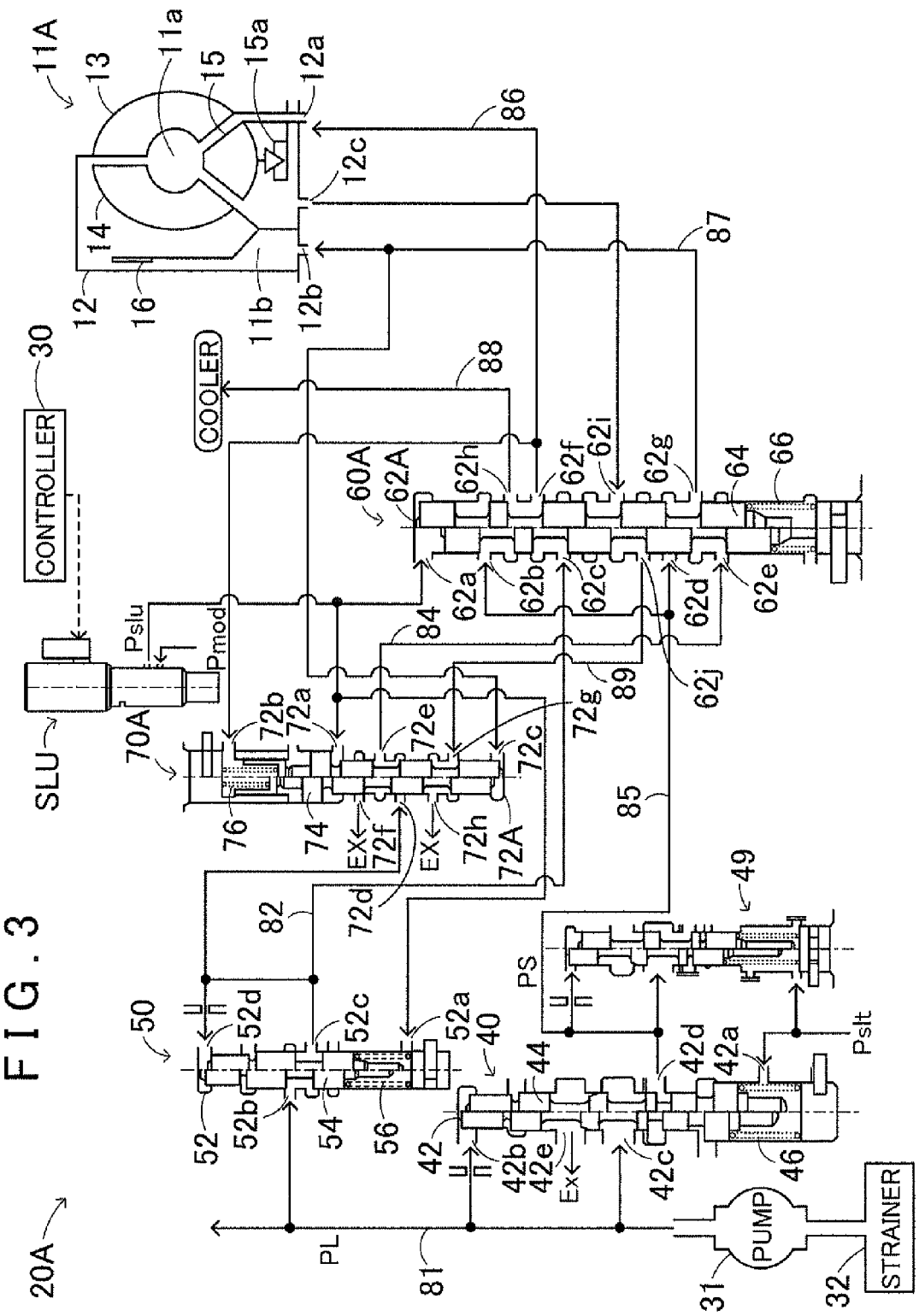
FIG. 3 is a diagram showing a schematic configuration of a hydraulic pressure control device 20A according to a modification.

In the embodiment, the engagement oil chamber 11a of the torque converter 11 is formed with one input/output port 11a. However, the present invention is not limited thereto, and the engagement oil chamber 11a may be formed with a plurality of ports. A schematic configuration of a hydraulic pressure control device 20A according to a modification for such a case is shown in FIG. 3. Components in FIG. 3 that are the same as those in FIG. 1 are denoted by the same reference symbols to omit description thereof. A torque converter 11A, a lock-up relay valve 60A, and a lock-up control valve 70A in FIG. 3 are formed by adding one or more components to the torque converter 11, the lock-up relay valve 60, and the lock-up control valve 70, respectively, in FIG. 1. Therefore, components other than those added are denoted by the same reference symbols to omit description thereof. The added components will be described below. As shown in FIG. 3, the torque converter 11A is additionally formed with an output port 12c that outputs oil from the engagement oil chamber 11a. In addition, the lock-up relay valve 60A is additionally formed with an input port 62i connected to the output port 12c of the engagement oil chamber 11a, and an output port 62j connected to a second communication oil passage 89. Further, the lock-up control valve 70A is additionally formed with an input port 72g connected to the output port 62j of the lock-up relay valve 60A via the second communication oil passage 89, and a drain port 72h that communicates with the input port 72g. Then, when the signal pressure from the linear solenoid SLU is not input to the lock-up relay valve 60A, communication between the input port 62i and the output port 62j is blocked. Therefore, the oil in the engagement oil chamber 11a is not output from the output port 12c. When the signal pressure from the linear solenoid SLU is input to the lock-up relay valve 60A, meanwhile, communication between the input port 62i and the output port 62j is allowed. Therefore, the oil in the engagement oil chamber 11a is output from the output port 12c to the second communication oil passage 89 via the input port 62i and the output port 62j communicated with each other, and drained via the input port 72g and the drain port 72h of the lock-up control valve 70A communicated with each other. Also in the thus configured hydraulic pressure control device 20A, as in the embodiment, the pressure regulation valve 50 regulates the line pressure PL to the engagement pressure P0 to output the engagement pressure P0 to the engagement pressure oil passage 82, and the lock-up control valve 70A receives and drops the engagement pressure P0 in the engagement pressure oil passage 82 to output the resulting pressure to the communication oil passage 84. Thus, the same effect as that of the embodiment can be achieved.

Figure 4:
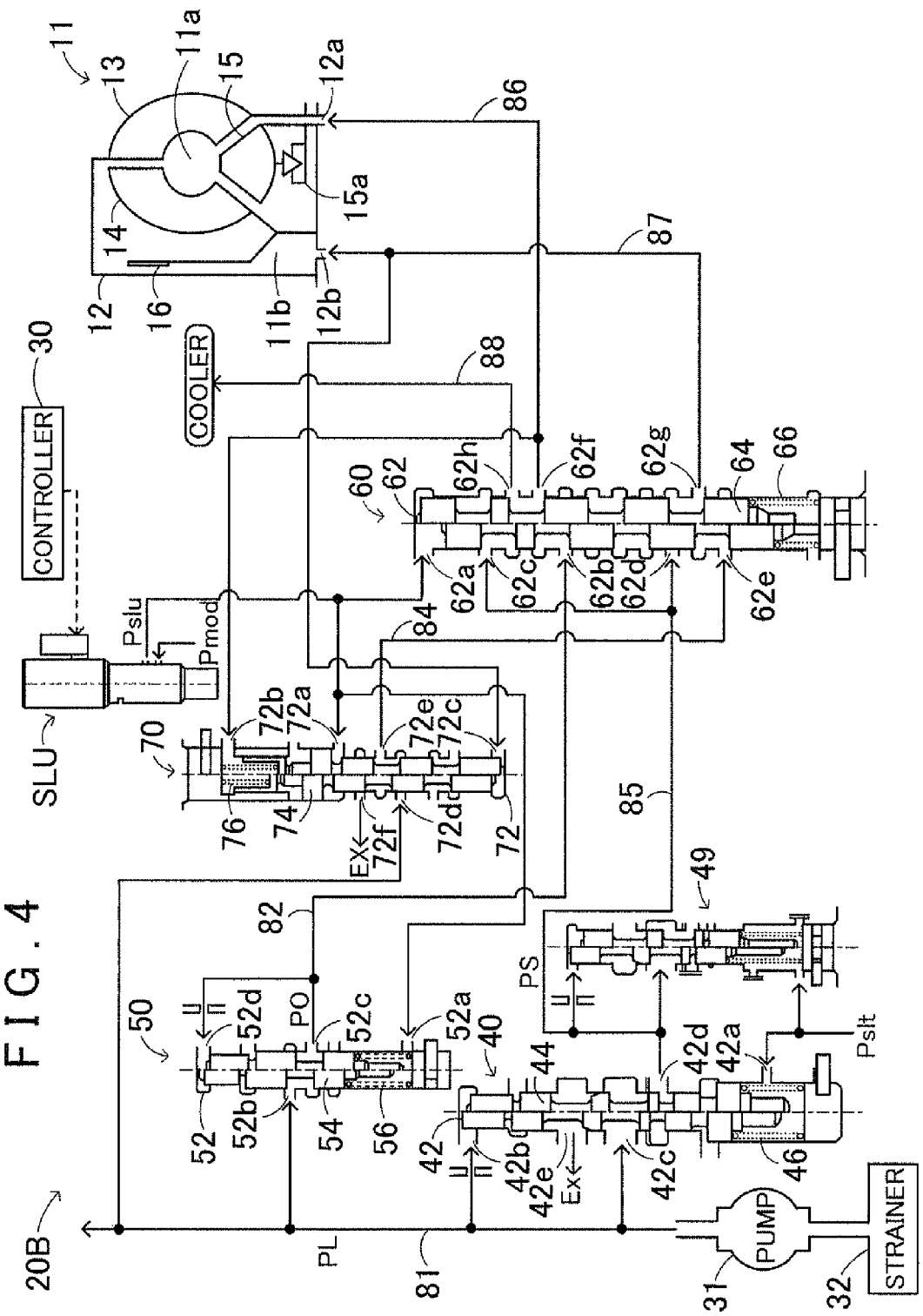
FIG. 4 is a diagram showing a schematic configuration of a hydraulic pressure control device 20B according to a modification.

In the embodiment, the lock-up control valve 70 is disposed in series with and in a stage subsequent to the pressure regulation valve 50 to receive the engagement pressure P0 output to the engagement pressure oil passage 82. However, the present invention is not limited thereto, and the lock-up control valve 70 may receive the line pressure PL in the line pressure oil passage 81. A schematic configuration of a hydraulic pressure control device 2013 according to a modification for such a case is shown in FIG. 4. As shown in the drawing, the line pressure PL in the line pressure oil passage 81 bypasses the pressure regulation valve 50 to be input to the input port 72d of the lock-up control valve 70. Also in the thus configured hydraulic pressure control device 20B, the pressure regulation valve 50 regulates the line pressure PL to the engagement pressure P0 to output the engagement pressure P0 to the engagement pressure oil passage 82, and the lock-up control valve 70 receives and drops the line pressure PL to output the resulting pressure to the communication oil passage 84. Thus, the same effect as that of the embodiment can be achieved.

In the embodiment, the hydraulic pressure of the torque converter 11 mounted on an automobile is controlled. However, the present invention is not limited thereto, and supply of a hydraulic pressure to the torque converter which includes the lock-up clutch which is engaged in accordance with the pressure difference between the engagement oil chamber and the disengagement oil chamber may be controlled. Also, a hydraulic pressure for a torque converter mounted on a movable body such as a vehicle other than an automobile, a ship, and an airplane may be controlled. Alternatively, a hydraulic pressure for a torque converter mounted on a stationary device may be controlled.

Here, the correspondence between the main elements of the embodiment and the main elements of the invention described in the "SUMMARY OF THE INVENTION" section will be described. In the embodiment, the mechanical oil pump 13 corresponds to a "mechanical pump". The primary regulator valve 40 which regulates the line pressure PL in the line pressure oil passage 81 serving as a first oil passage corresponds to a "first pressure regulation valve". The pressure regulation valve 50 which outputs the engagement pressure P0 obtained by regulating the line pressure PL to the engagement pressure oil passage 82 serving as a second oil passage corresponds to a "second pressure regulation valve". The lock-up control valve 70 which outputs a hydraulic pressure obtained by regulating the engagement pressure P0 to the communication oil passage 84 serving as a third oil passage corresponds to a "third pressure regulation valve". In addition, the linear solenoid SLU corresponds to a "signal pressure output valve". The lock-up relay valve 60 corresponds to "switching valve". Further, the controller 30 corresponds to a "control unit". The correspondence between the main elements of the embodiment and the main elements of the invention described in the "SUMMARY OF THE INVENTION" section does not limit the elements of the invention described in the "SUMMARY OF THE INVENTION" section, because the embodiments are an example given for the purpose of specifically describing the invention described in the "SUMMARY OF THE INVENTION" section. That is, the invention described in the "SUMMARY OF THE INVENTION" section should be construed on the basis of the description in that section, and the embodiment is merely a specific example of the invention described in the "SUMMARY OF THE INVENTION" section.

While a mode for carrying out the present invention has been described above by way of an embodiment, it is a matter of course that the present invention is not limited to the embodiment in any way, and that the present invention may be implemented using various embodiments without departing from the scope and sprit of the present invention.

The present invention is applicable to the hydraulic pressure control device manufacturing industry.

What is claimed is:

1. A hydraulic pressure control device that controls supply of a hydraulic pressure to a torque converter including a lock-up clutch that is engaged in accordance with a difference in oil pressure between an engagement oil chamber and a disengagement oil chamber, comprising:
    a mechanical pump driven by power supplied by a motor to generate a hydraulic pressure;
    a first pressure regulation valve configured to regulate a hydraulic pressure in a first oil passage coupled to the mechanical pump and to regulate discharge of oil:
    a second pressure regulation valve configured to (i) receive the hydraulic pressure in the first oil passage and (ii) regulate the received hydraulic pressure to be an engagement pressure for use for engagement of the lock-up clutch in accordance with a first signal pressure to output the engagement pressure to a second oil passage that supplies the oil to the engagement oil chamber; and a third pressure regulation valve configured to (i) receive the hydraulic pressure in the first oil passage or the engagement pressure output to the second oil passage and (ii) regulate the received pressure in accordance with the first signal pressure or a second signal pressure that synchronizes with the first signal pressure to output the resulting pressure to a third oil passage that supplies the oil to the disengagement oil chamber, wherein the second pressure regulation valve is configured to output a pressure that increases as the first signal pressure increases, and the third pressure regulation valve is configured to output a pressure that decreases as the first signal pressure or the second signal pressure increases.

2. The hydraulic pressure control device according to claim 1, wherein the second pressure regulation valve and the third pressure regulation valve are configured such that the difference in pressure of the oil between the engagement oil chamber and the disengagement oil chamber increases as the first signal pressure, increases.

3. The hydraulic pressure control device according to claim 2, wherein:

the second pressure regulation valve incrementally increases the pressure as the first signal pressure increases until the first signal pressure reaches a predetermined pressure, and keeps a maximum pressure irrespective of the first signal pressure after the first signal pressure reaches the predetermined pressure; and the third pressure regulation valve incrementally decreases the pressure as the first signal pressure increases.

4. The hydraulic pressure control device according to claim 1, wherein the third pressure regulation valve is disposed in series with and in a stage subsequent to the second pressure regulation valve.

5. The hydraulic pressure control device according to claim 1, further comprising:

a switching valve connected to the second oil passage, the third oil passage, a discharge oil passage through which the oil is discharged from the first pressure regulation valve, an engagement oil passage coupled to the engagement oil chamber, and a disengagement oil passage coupled to the disengagement oil chamber, the switching valve being selectively switchable between (i) a first state in which the second oil passage and the engagement oil passage are connected to each other and the third oil passage and the disengagement oil passage are connected to each other and (ii) a second state in which the discharge oil passage and the disengagement oil passage are connected to each other, and the switching valve being switched to the first state to engage the lock-up clutch and switched to the second state to disengage the lock-up clutch.

* * * * *